(12) United States Patent
Norman

(10) Patent No.: US 7,469,936 B2
(45) Date of Patent: Dec. 30, 2008

(54) PIPE COUPLING

(75) Inventor: Jamie Norman, Toronto (CA)

(73) Assignee: Cambridge Brass, Inc., Cambridge, Ontario (CA)

( * ) Notice: Subject to any disclaimer, the term of this patent is extended or adjusted under 35 U.S.C. 154(b) by 171 days.

(21) Appl. No.: 10/997,457

(22) Filed: Nov. 24, 2004

(65) Prior Publication Data

US 2005/0264005 A1    Dec. 1, 2005

(30) Foreign Application Priority Data

May 31, 2004    (CA)    .................................... 2469353

(51) Int. Cl.
*F16L 33/00*    (2006.01)

(52) U.S. Cl. ...................... 285/249; 285/255; 285/331; 285/354; 285/386; 285/389

(58) Field of Classification Search ......... 285/248–249, 285/255–256, 354, 382, 382.7, 386, 389, 285/331
See application file for complete search history.

(56) References Cited

U.S. PATENT DOCUMENTS

| | | | | |
|---|---|---|---|---|
| 1,066,214 A | * | 7/1913 | Mulconroy et al. | ......... 285/347 |
| 2,497,274 A | * | 2/1950 | Richardson | ..................... 285/3 |
| 2,523,578 A | * | 9/1950 | Lewis | ....................... 285/332.2 |
| 2,641,487 A | * | 6/1953 | La Marre | .................... 285/341 |
| 5,105,854 A | * | 4/1992 | Cole et al. | .................. 138/109 |
| 2003/0197380 A1 | * | 10/2003 | Chelchowski et al. | ....... 285/354 |

* cited by examiner

*Primary Examiner*—Aaron Dunwoody
*Assistant Examiner*—Fannie Kee
(74) *Attorney, Agent, or Firm*—Wood, Phillips, Katz, Clark and Mortimer

(57) ABSTRACT

A coupling for creating a fluid-conducting connection between a pipe and a stub, where the stub has no pipe-supporting extension over which the pipe is to be connected. The coupling includes a coupling body having a forward end for being secured to the stub, a rearward end for receiving the pipe, and an internal bore therethrough; stub connection for securing the forward end of the coupling body to the stub; a pipe support for providing internal support for an end section of the pipe being engaged by the coupling; gripper engaging means for causing the gripper to grip the pipe; a seal between the stub and the pipe; and a gripper located within the internal bore of the coupling body, the gripper and the coupling body configured to engage the pipe with the gripper when the stub is secured in the stub connection.

24 Claims, 6 Drawing Sheets

PIPE COUPLING

FIELD OF THE INVENTION

The invention relates to pipe couplings, and in particular to couplings used to connect pipes to fittings such as valves and adapters.

BACKGROUND OF THE INVENTION

Particularly in the plumbing and waterworks industries, situations frequently arise during installation or repair of piping where it is necessary to connect pipes to various fittings such as corporation valves, curb valves and various adapters. These situations can arise for example during water service line installation or repair. Such piping can include service tubes and may be made of polyethylene pipe/tubing for example.

Typically, such fittings are provided with a stub, usually externally threaded, for receiving a sealed fluid-communicating connection with the pipe. The threading on such stubs is typically of an industry standard such as corporation fitting thread, to allow standard threaded couplings to be mounted thereon.

Such pipe-fitting couplings typically come in two main forms. In a first form the coupling is integral with the pipe. The present invention is directed to the second form where the coupling is a separate device that clamps on to, or is otherwise sealingly affixed to the end of the pipe. In either case the end of the coupling intended to engage the fitting stub is provided with internal threading and the coupling is connected to the fitting stub by turning one relative to the other thereby engaging the internal threading of the coupling with the external threading of the stub.

A typical manner in which such a separate coupling is used to connect a pipe to a fitting stub is as follows. First a coupling body, having internal threads at a forward end for engaging the external threads of the stub, and a constricted rearward end, is slid on to the pipe, rearward end first. A combination of various internal elements including seals and camming or gripping means are then slid on to and/or in to the pipe. Finally, the coupling body is screwed onto the stub trapping and compressing the seals and the camming or gripping means. In particular, the constricted rearward end of the coupling body presses the seals and camming or gripping means against the end of the stub or against the exterior or interior surface of the pipe. The compressed seals create a hydrostatic seal between the stub and the pipe, while the camming or gripping means are urged to a locking and restraining position preventing the pipe from being pulled out of the coupling inadvertently. Using such a coupling, a secure pressure-sealed connection is made.

Where the pipe has a high level of structural integrity, the camming or gripping means may be applied against the outside surface of the pipe without the need for any additional support on the interior of the pipe. However, where excessive exterior pressure on the pipe would result in the pipe collapsing such that the pipe is damaged and/or the seals or camming or gripping means fails, internal support is typically provided in the form of a tubular insert either in plastic or stainless steel. Where the fitting stub already has a pipe-supporting extension for insertion within the pipe, the coupling need not provide a tubular insert.

One difficulty with such couplings is the need for the user to handle a number of small elements (typically the seals, and camming and gripping elements) during installation. This can result in frustration on the part of the user while he fumbles with the various parts to ensure that they are installed in the correct order and orientation. If the user fails to install these parts in the correct order and orientation, the connection can fail resulting in leakage. This disadvantage is particularly acute where installation takes place in difficult conditions, for example where the fitting is located in an awkward location, or where the installation is taking place on waterworks, often with the user standing in a wet and muddy hole where fingers are slippery and where a dropped part is irretrievably lost.

Further, the camming or gripping means typically used on the exterior of the pipe can often result in an excessive localization of forces that may result in damage and/or collapse of the pipe that can result in failure.

Additionally, most present couplings are not reusable since the camming or gripping means used are permanently deformed during use.

Finally, with most present couplings the coupling can easily be under-tightened or over-tightened onto the pipe and/or the fitting, which may result in damage to the pipe, to the fitting or to the coupling and may also result in failure of the coupling.

SUMMARY OF THE INVENTION

This invention provides an improved coupling for connecting pipes to fittings, which improved coupling addresses one or more of the problems noted above.

In a broad aspect, the present invention provides a coupling for creating a fluid-conducting connection between a pipe and a stub, said stub being free of a pipe-supporting extension over which the pipe is to be slid, said coupling comprising: a coupling body having a forward end for being secured to the stub, a rearward end for receiving the pipe, and an internal bore therethrough; stub securing means for securing the forward end of the coupling body to the stub; a gripper located within the internal bore of said coupling body for gripping said pipe; gripper retaining means for retaining said gripper within said coupling body during handling of the coupling body; pipe-supporting means for providing internal support for an end section of the pipe being engaged by the coupling; gripper engaging means for causing the gripper to grip the pipe; and sealing means for creating a seal between the stub and the pipe.

Other aspects of the invention include the above coupling wherein:

- the gripper is a gripper ring having three or fewer spaced annular interior gripping surfaces for gripping said pipe;
- the gripper ring has two spaced annular interior gripping surfaces for gripping said pipe;
- the gripper ring is a split ring such that the gripper ring can constrict radially;
- the annular gripping surfaces have annular teeth thereon;
- the gripper is sized to fit between an interior surface of the coupling body and an outer surface of the pipe once the pipe is received within the rearward end of the coupling body;
- the pipe-supporting means is an insert having a rigid support tube at its rearward end, said support tube being adapted to be slid within the end section of the pipe;
- a rear end of said support tube is located rearwardly of said gripper;
- the sealing means for creating a seal between the stub and the pipe includes a rearward seal mounted on an exterior surface of said support tube to create a seal between the support tube and the pipe when the support tube is slid within the pipe;
- the rearward seal is an O-ring;

the support tube has forward-facing barbs on its exterior surface to resist inadvertent pullout of the pipe from the coupling;

the barbs on the support tube are annular;

an interior surface of a rearward end of said support tube is beveled;

the support tube is sized such that its exterior surface closely fits within the pipe;

the insert has at its forward end, an inner web adapted to be inserted within the stub;

the inner web is sized to fit closely within the stub;

the sealing means for creating a seal between the stub and the pipe includes a forward seal mounted on an exterior surface of said inner web to create a seal between the inner web and the stub when the inner web is slid within the stub;

the forward seal is an O-ring;

the insert has a radially outwardly projecting annular rib extending from a forward end of the support tube;

the annular rib has a forward face adapted to abut against a rearward end of said stub, and a rearward surface adapted to abut against a forward end of said pipe;

the insert has an outer web extending rearwardly from an outer end of said annular rib;

the outer web is sized to fit closely between the pipe and the coupling body;

the gripper engaging means comprises gripper constricting means for radially constricting the gripper such that the gripper engages an exterior surface of said pipe;

when constricted, at least a portion of said gripper intersects a plane which includes the rearward seal and which is perpendicular to a longitudinal axis of said coupling body;

the gripper has a sloped rearward surface, the gripper retaining means is a gripper retaining recess formed on an inner surface of the coupling body for receiving said gripper, said gripper retaining recess having a sloped rearward surface, said sloped rearward surface of said gripper retaining recess adapted to abut the sloped rearward surface of the gripper, and said gripper constricting means comprising moving the coupling body forward relative to the gripper such that cooperation between the sloped rearward surface of the gripper and the sloped rearward surface of the gripper retaining recess causes the gripper to radially constrict;

the coupling body is moved forward relative to the gripper by moving the coupling body forward and resisting substantial forward movement of the gripper by abutting of the forward end of the gripper against a rearward end of said outer web of said insert, forward movement of said insert being restrained by abutting of said forward face of said annular rib against the rearward end of said stub;

the gripper has a sloped forward surface, the rearward end of the outer web has a beveled inner surface, said beveled inner surface of said rearward end of said outer web adapted to abut the sloped forward surface of the gripper, said gripper constricting means further comprising moving the gripper forward relative to the outer web such that cooperation between the sloped forward surface of the gripper and the beveled inner surface of said outer web further causes the gripper to radially constrict;

the gripper is moved forward relative to the outer web by the forward movement of the coupling body causing the gripper to move forward slightly;

the stub is externally threaded and the stub securing means is an internal threading of a forward portion of said coupling body, an interior of said forward portion of the coupling body being sized to fit closely over the stub, and said internal threading of said coupling body matching the external threading of said stub;

the coupling body is moved forward by screw-tightening the forward portion of the coupling body onto the stub;

the gripper retaining recess is a circumferential groove;

an exterior surface of the forward portion of said coupling body is hexagonal to facilitate tightening of the coupling body onto the stub;

the stub further comprises a shoulder positioned forwardly of said external threading, said shoulder having a rearward face, and said coupling being fully tightened when a forward face of said coupling body abuts against the rearward face of the shoulder of the stub;

the pipe is polyethylene;

coupling is coupled to the stub; and/or the coupling is coupled to the pipe.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF THE PREFERRED EMBODIMENTS

A preferred embodiment of the coupling of the present invention is shown in the attached drawings. In the exemplary application illustrated, the coupling is used to connect a polyethylene pipe to a cast brass alloy fitting stub in a waterworks application. The coupling is located between the pipe and the stub.

In this description and in the claims, the terms "axial" and "axially" are used to describe a direction parallel to a centerline of the pipe once the coupling is installed, while "radial" and "radially" are used to describe a direction perpendicular to and extending from the centerline of the pipe once the coupling is installed. Further, "forward" is used to describe features which are located nearer the fitting stub and away from the pipe once the coupling is installed, while "rearward" is used to describe features which are located nearer the extended pipe and away from the fitting stub once the coupling is installed.

Figure 1A:
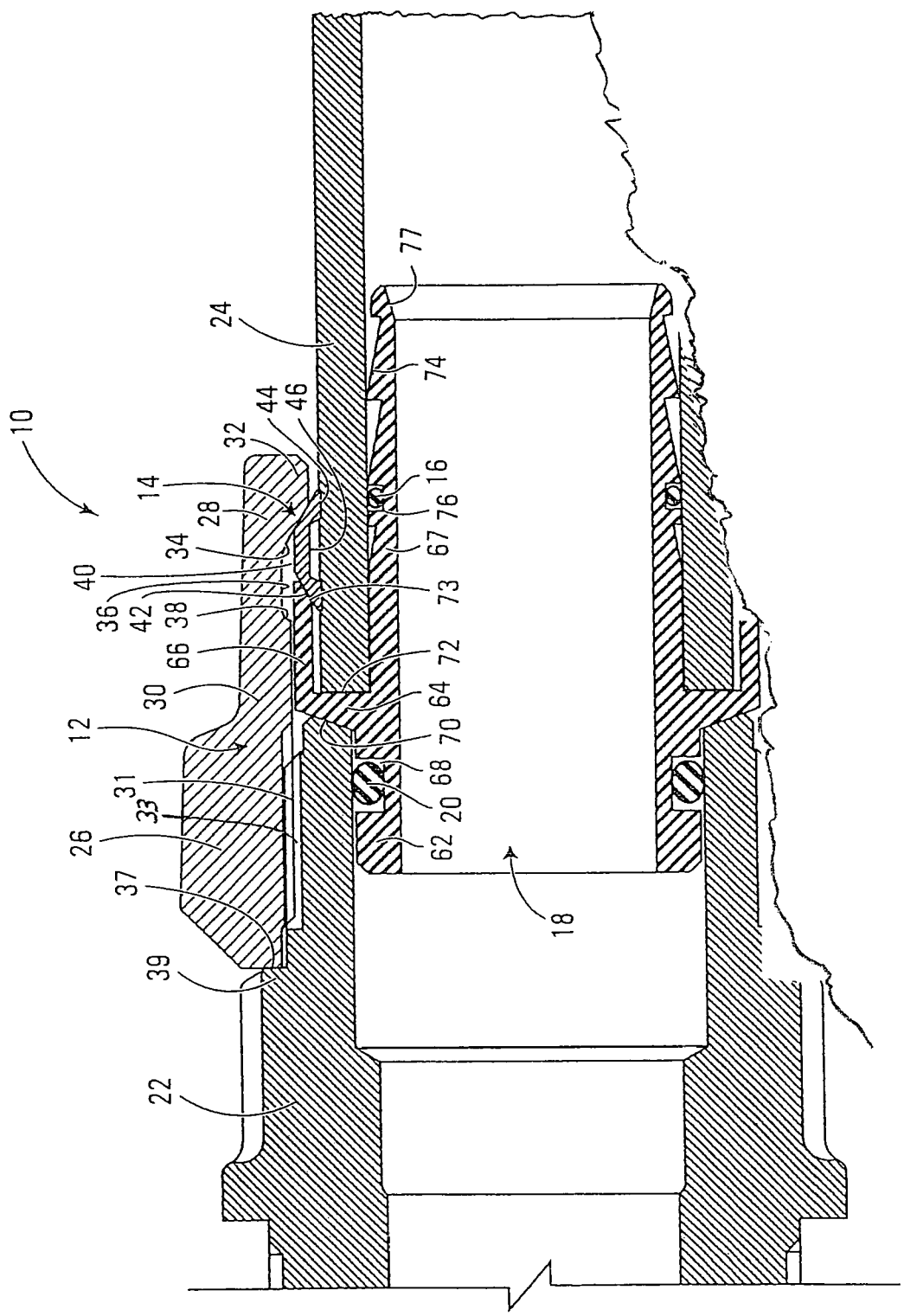
FIG. 1A is a partially broken, side cross-sectional view of a coupling in accordance with a preferred embodiment of the present invention, installed on a fitting stub and pipe.
Figure 1B:
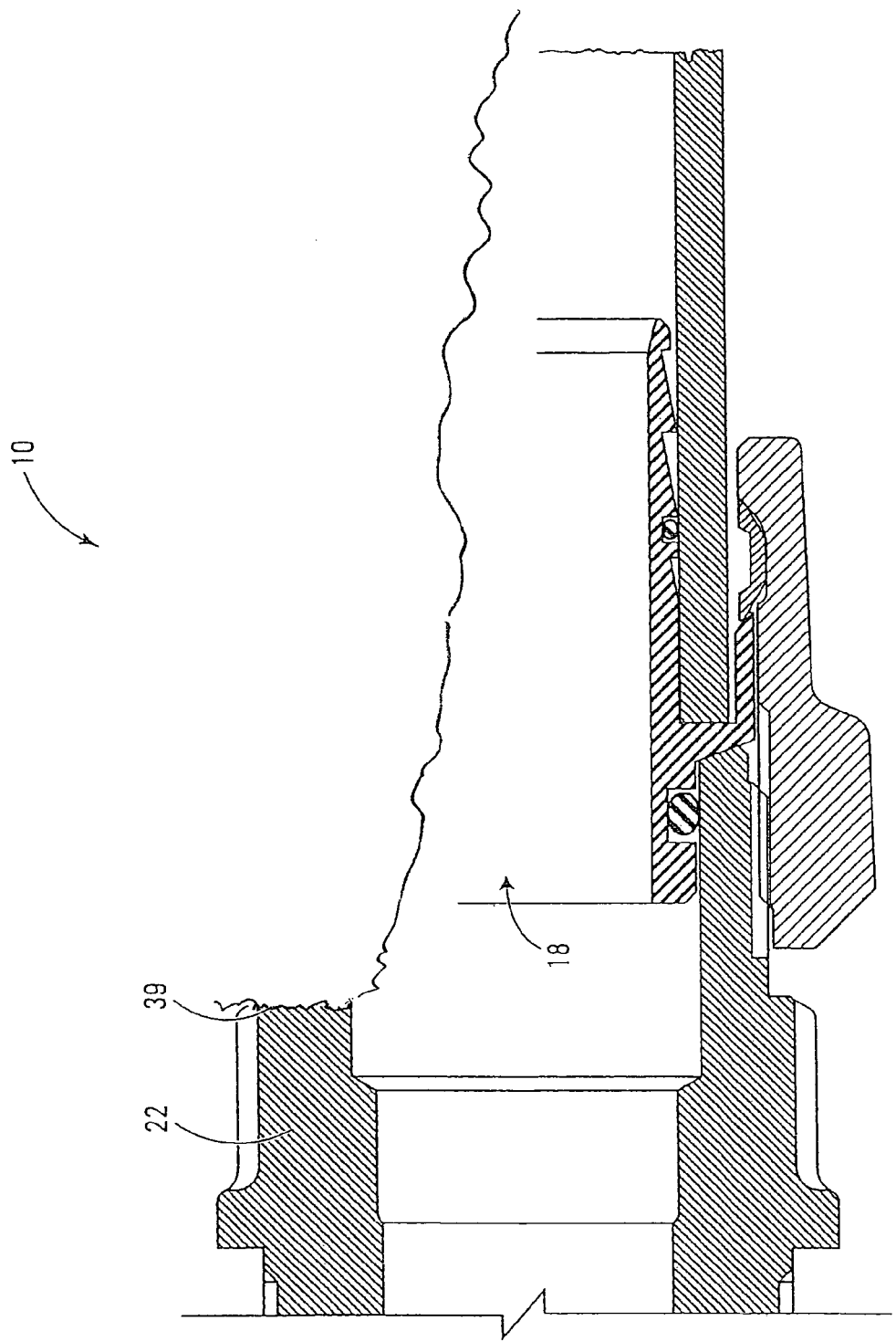
FIG. 1B is a view similar to FIG. 1, but showing the counling in a loosened state with respect to the fitting stub and pipe.
Figure 2:
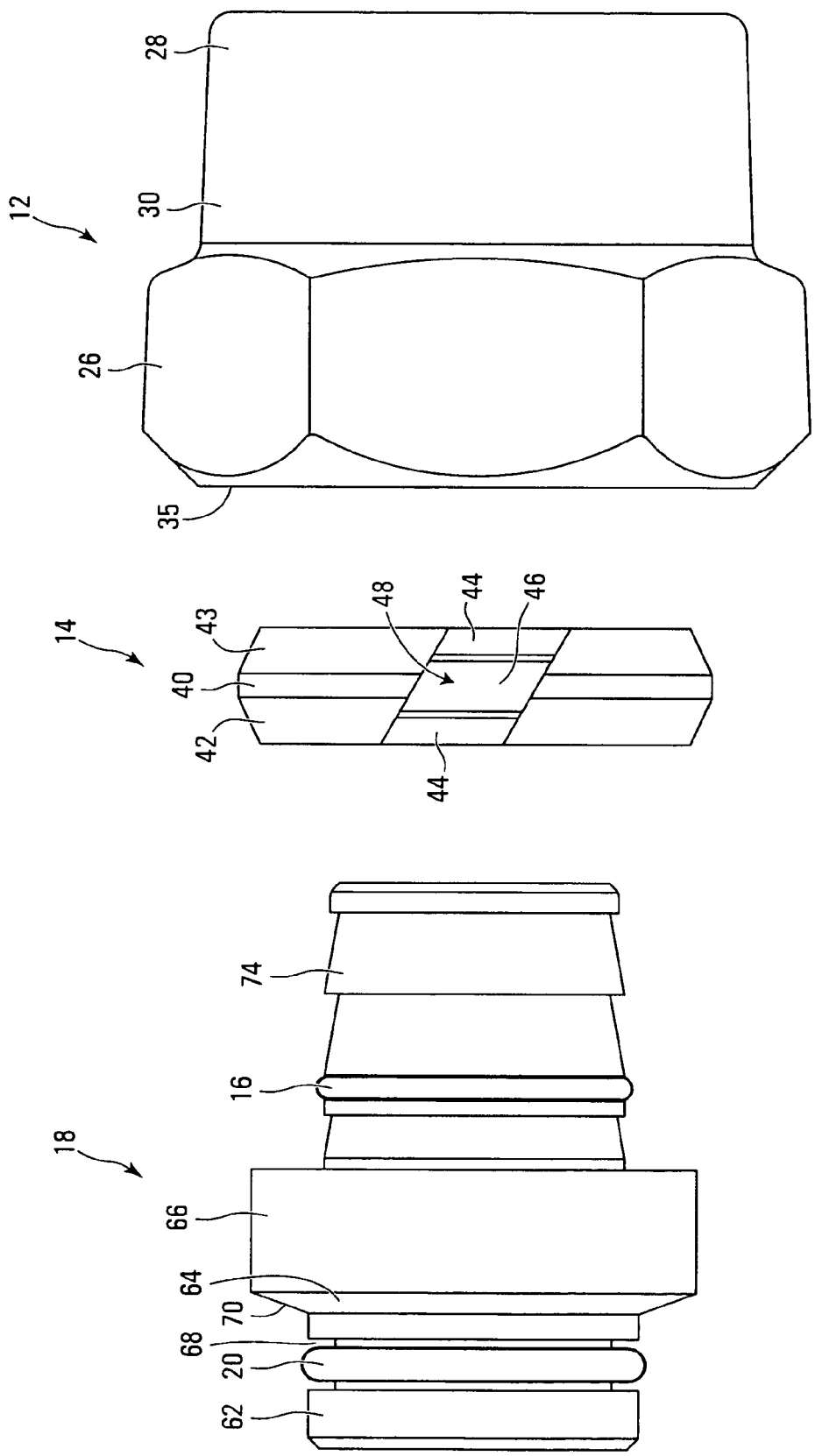
FIG. 2 is an exploded side view of the coupling.
Figure 3:
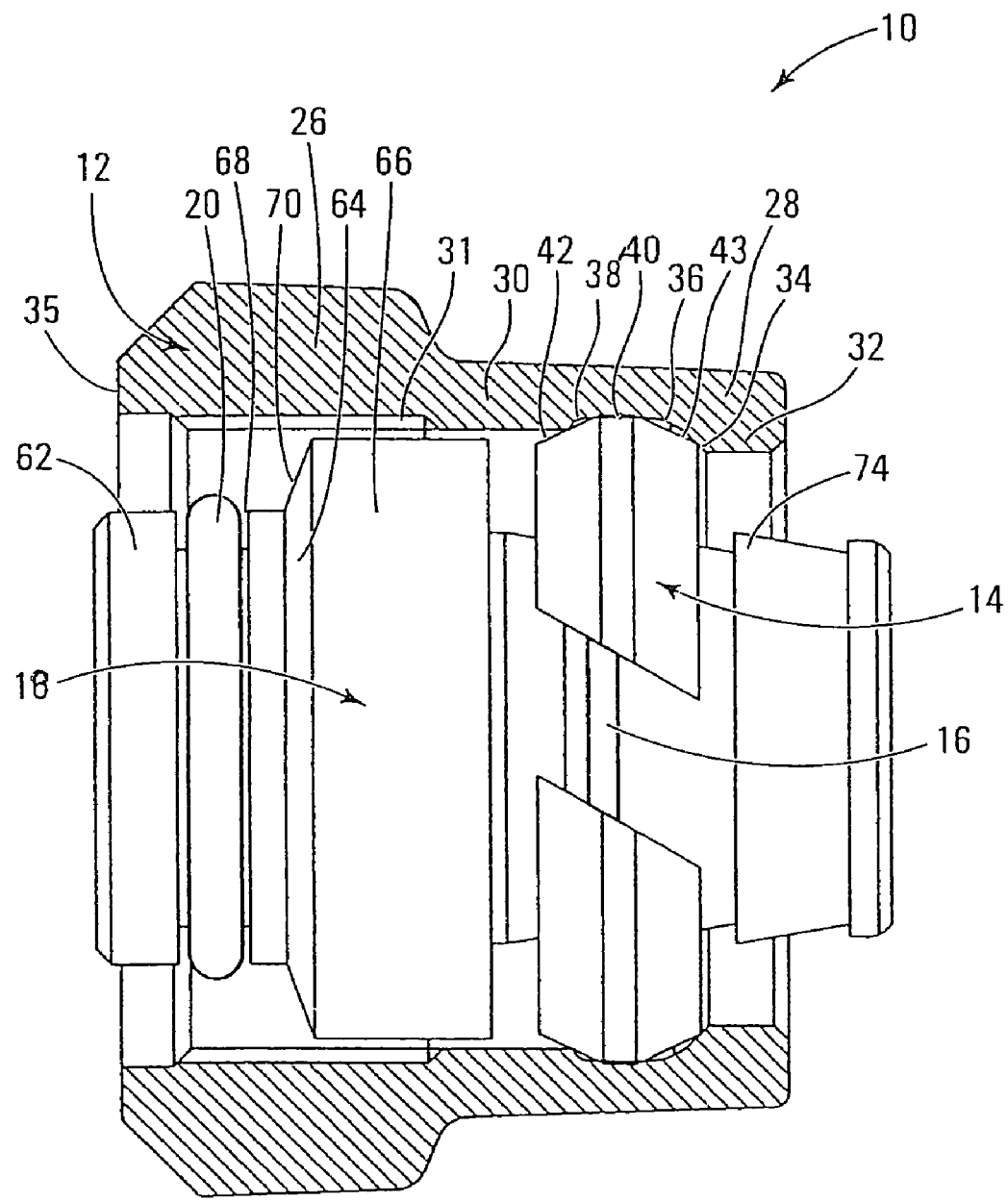
FIG. 3 is a side partial cross-sectional view of the coupling.

FIG. 1A is a cross-sectional view of the coupling 10 installed on a fitting stub 22 and pipe 24. The coupling 10 consists mainly of a coupling body 12, a gripper ring 14, and an insert 18 having a froward seal 20 and a rearward seal 16. The coupling 10 is shown affixed to the stub 22 of a fitting (not shown), and with the pipe 24 installed therein. In this exemplary application, the fitting can be any plumbing or waterworks fitting having an externally-threaded stub 22 having the features described herein, onto which it is desirable to connect the pipe 24. FIG. 1B depicts the coupling 10 loosely engaging the stub 22 while FIG. 1A shows the coupling 10 tightened on to the stub 22. FIG. 2 shows an exploded side view of the coupling 10 while FIG. 3 shows a side partial cross-sectional view of the coupling.

Coupling Body

Figure 4:
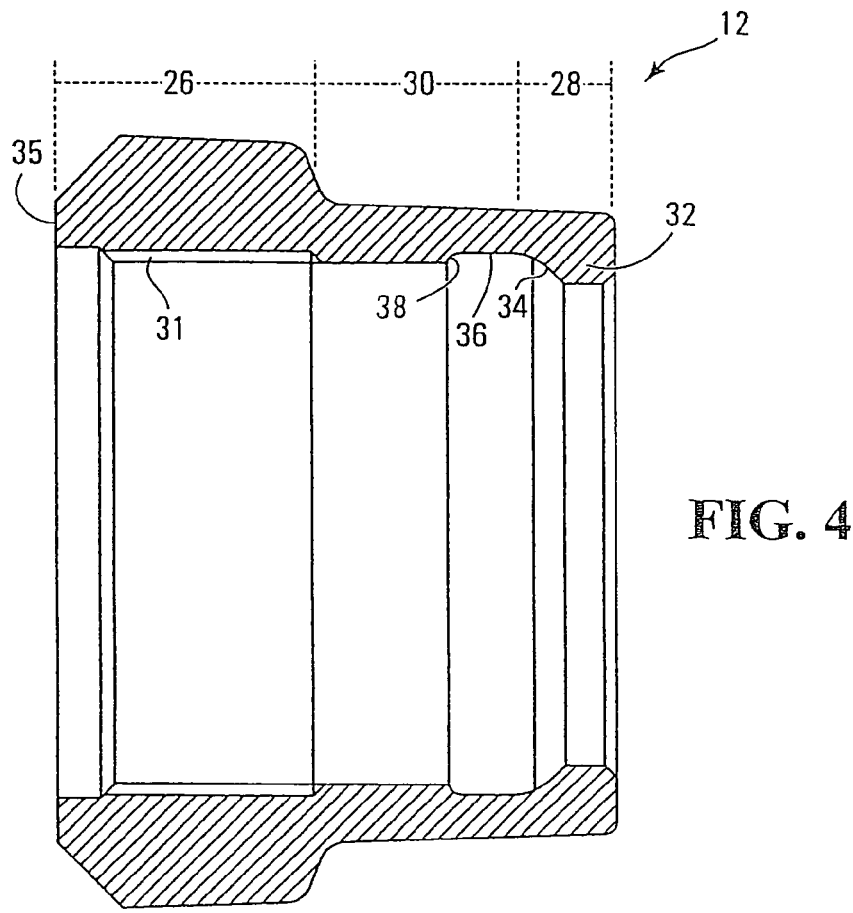
FIG. 4 is a side cross-sectional view of a coupling body of the coupling.

The coupling body 12 in the preferred embodiment (illustrated in detail in FIG. 4) is made of cast brass alloy and is generally a hollow cylinder. The coupling body 12 has a nut section 26 at a forward end, a constricted section 28 at a rearward end, and an intermediate section 30 in between.

The nut section 26 of the coupling body 12 is provided with a hexagonal exterior to accommodate hand-tightening or tool-tightening of the coupling body 12 on to the fitting stub 22. The interior of the nut section 26 is sized so as to engage an outer surface of the stub 22 and is provided with internal threading 31 which matches external threading 33 of the stub 22. In the preferred embodiment, the threading 33, 31 on the stub 22 and the interior of the nut section 26 is corporation fitting thread, though it is to be understood that other threads can be used. A forward end of the nut section 26 is provided with a flat face 35 which abuts a rearward face 37 of a shoulder 39 on the stub 22 when the coupling body 12 is fully tightened onto the stub 22 as shown in the top half of FIG. 1.

The coupling body 12 is provided at its rearward end with a constricted section 28 having an interior constriction 32. The interior constriction 32 is sized so as to fit closely over the pipe 24 and serves to retain the gripper ring 14, and insert 18 within the coupling body 12 when the coupling body 12 is screwed onto the stub 22.

Located at an interface between the constricted section 28 and the intermediate section 30 is a gripper-constricting slope 34 which is an angled surface in the interior of the coupling body 12 formed as the interior diameter of the coupling body 12 expands from the interior constriction 32 to a gripper retainer groove 36 (discussed further below). This gripper-constricting slope 34 causes the gripper ring 14 to constrict around the pipe 24 once the coupling body 12 is tightened onto the stub 22, as further discussed below. In the preferred embodiment, the angle of the gripper-constricting slope 34 is approximately 45 degrees though it is to be understood that other suitable angles may be utilized.

Adjacent the gripper-constricting slope 34 is the gripper retainer groove 36 which is an interior circumferential groove formed in the coupling body 12 and which has a sloped forward face 38. The gripping retaining groove 36 retains the gripper ring 14 in place within the coupling body 12.

Gripper Ring

Figure 5A:
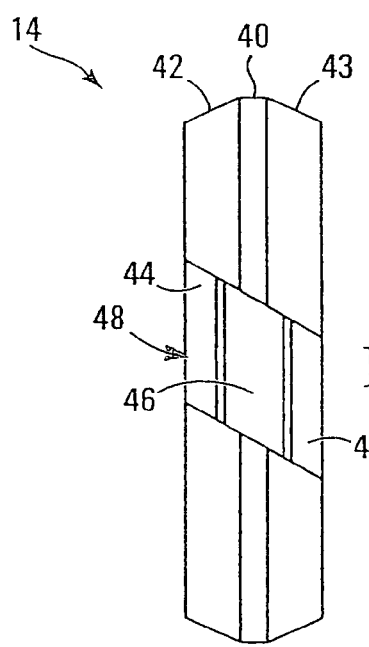
FIG. 5A is a side non-cross-sectional view of a gripper ring of the coupling.
Figure 5B:
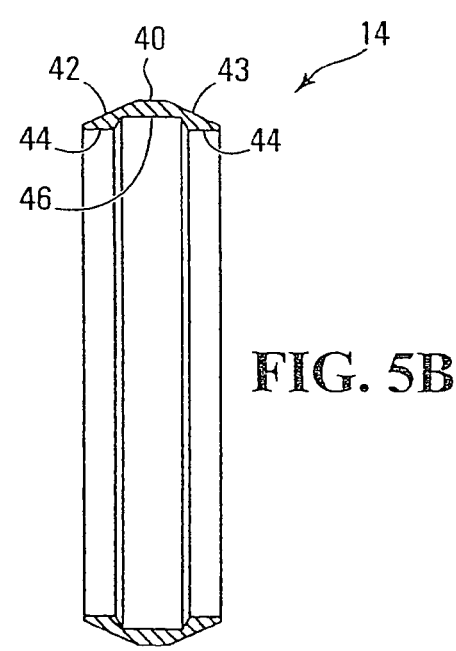
FIG. 5B is a side cross-sectional view of the gripper ring of FIG. 5A.

As shown in FIGS. 5A and 5B, the gripper ring 14 is made of brass alloy and is an annular split ring.

In side cross-section, the radially exterior surface of the gripper ring 14 has a substantially horizontal central surface 40 with radially inwardly sloped surfaces 42, 43 extending forwardly and rearwardly therefrom. In the preferred embodiment, the angle of the exterior sloped surfaces 42, 43 is 25 degrees to the horizontal central surface 40.

The exterior surface of the gripper ring 14 is shaped such that the gripper ring 14 will be retained within the gripper-retaining groove 36 of the coupling body 12 once it is inserted within, and such that movement of the gripper ring 14 rearwardly relative to the gripper-retaining groove 36 will cause the gripper ring 14 to constrict radially. Once inserted within the gripper-retaining groove 36 of the coupling body 12, rearward movement of the gripper ring 14 is resisted by the rearward exterior sloped surface 43 of the gripper ring 14 abutting against the gripper-constricting slope 34 of the coupling body 12. If the gripper ring is urged in a rearward direction within the gripper-retaining groove 36, the rearward exterior sloped surface 43 of the gripper ring 14 slides along the gripper-constricting slope 34 causing the gripper ring 14 to constrict. Forward movement of the gripper ring 14 is resisted by the forward exterior sloped surface 42 of the gripper ring abutting against the sloped forward surface 38 of the gripper-retaining groove 36 of the coupling body 12.

Still in side cross-section, the radially interior surface of the gripper ring 14 is shaped such that the interior of the gripper ring 14 has two annular gripping surfaces 44 separated by a central annular groove 46. In other embodiments the gripper ring 14 may have three or more spaced gripping surfaces 44. Additionally, to improve gripping strength, these annular gripping surfaces 44 may be provided with annular ridges or teeth.

The gripper ring 14 is also provided with a split 48 to allow radial constriction of the gripper ring 14 during insertion into the coupling body 12 and when gripping the pipe 24.

Insert

Figure 6:
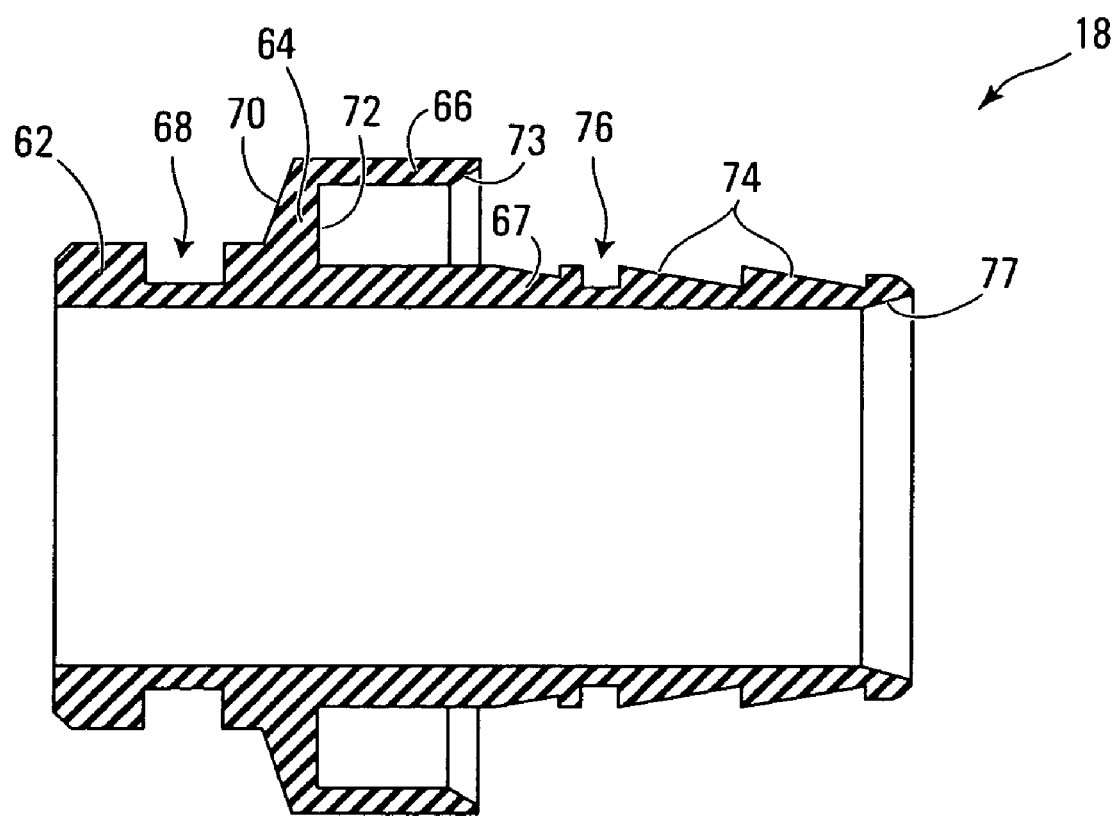
FIG. 6 is a side cross-sectional view of an insert of the coupling.

As shown in FIG. 6, the insert 18 is made of copper alloy and consists, moving from its forward end to its rearward end, of an inner web 62, an annular rib 64, an outer web 66 and a support tube 67.

The inner web 62 is of a diameter smaller than the outer web 66 and its exterior surface is sized to fit closely within an inner surface of the stub 22. The inner web also has on its outer surface a circumferential forward seal groove 68 shaped and sized to accommodate the forward seal 20.

The annular rib 64 connects the inner web 62, the outer web 66 and the support tube 67, has a forward face 70 shaped to engage a rearward end face of the stub 22, and a rearward face 72 shaped to engage a forward end face of the pipe 24.

The outer web 66 is sized such that its outer surface closely fits within the coupling body 12 and its inner surface fits over the pipe 24. A rearward face 73 of the outer web 66 is angled 45 degrees so as to engage the forward exterior sloped surface 42 of the gripper ring 14.

The support tube 67 extends rearwardly from the inner web 62 and its exterior surface is sized to fit closely within an inner surface of the pipe 24. The support tube 67 has on its exterior surface forwardly-oriented barbs 74 which serve to resist pull-out of the pipe 24 once the pipe 24 is inserted into the coupling 10 and the coupling 10 is tightened onto the stub 22. The exterior surface of the support tube 67 also has a circumferential rearward seal groove 76 shaped and sized to accommodate the rearward seal 16. An interior surface 77 of a rearward end of the support tube 67 is sloped outwardly so as to direct fluid flowing forwardly through the pipe 24 into the interior of the insert 18.

Use

A description of an exemplary manner in which the preferred embodiment of the coupling of the present invention may be used is set out below.

First, the coupling body 12, and the gripper ring 14 are assembled into a coupling body assembly. To do so, the gripper ring 14 is slid into the forward end of the coupling body 12. This step can be performed either manually, or using an insertion device and is facilitated by the split 48 in the gripper ring 14. The gripper ring 14 is pushed into the coupling body 12 until it is positioned within the gripper retaining groove 36 on the interior surface of the coupling body 12 art which point the resiliency of the gripper ring 14 causes it to expand to seat within the gripper retaining groove 36. Once in this position, extraction of the gripper ring 14 from the coupling body 12 is resisted by abutment of the forward exterior sloped surface 42 of the gripper ring 14 against the sloped forward surface 38 of the gripper-retaining groove 36 of the coupling body 12. Thus, once the gripper ring 14 is positioned within the coupling body 12 as described, the gripper ring 14 is held in place and will not fall out under normal handling.

The assembly of the coupling body 12 and gripper ring 14 may be performed at the factory such that the user receives a preassembled unit, or the user may assemble these elements just prior to use. Once the coupling body 12 and the gripper ring 14 are assembled into an assembled coupling body, the only remaining loose part of the coupling 10 is the insert 18 which comes preassembled with the forward seal 20 and the rearward seal 16 mounted thereon.

At a work site, the forward end of the pipe 24 is cut so that the end is square. The inside of the pipe 24 is then optionally bevelled with a reaming tool so that the pipe 24 can slide over the support tube 67 of the insert 18 easily.

Next, the insert 18 is inserted into the fitting stub 22 such that the inner web 62 of the insert 18 resides within the end of the stub 22. The insert 18 is slid into the stub 22 until the rearward end face of the stub 22 engages the forward face 70 of the annular rib 64 of the insert 18. In this position, the forward seal 20 creates a seal against the stub 22 thereby preventing leakage of fluid out the forward end of the coupling 10.

The coupling body assembly is then placed over the insert 18 such that the forward end of the coupling body 12 slides over the outer web 66 of the insert 18 until the internal threading 31 of the nut section 26 of the coupling body 12 first engages the exterior threading 33 of the stub 22. The coupling body 12 is then hand-tightened onto the stub 22, thereby further engaging the interior threading 31 of the coupling body 12 and the exterior threading 33 of the stub 22, and moving the coupling body 12 further over the insert 18 and the stub 22. Typically, the coupling body 12 is hand-tightened onto the stub 22 until the rearward face 73 of the outer web 66 of the insert 18 abuts against the forward exterior sloped surface 42 of the gripper ring 14 thereby creating some resistance to further tightening.

The pipe 24 is then "stab-fitted" over the support tube 67 of the insert 18 and into the rearward opening of the coupling body 12. The pipe 24 is pushed forward until the forward end face of the pipe 24 abuts against the rearward face 72 of the annular rib 64 of the insert 18.

The coupling body 12 is then further tightened onto the stub 22 either by hand or by using a tool. Because the stub 22, the insert 18, the gripper ring 14 and the interior constriction 32 of the coupling body 12 all abut against one another, this further tightening causes the gripper ring 14 to move rearwardly to accommodate the decreasing distance between the rearward face 73 of the outer web 66 of the insert 18 and the gripper-constricting slope 34. As it does so, cooperation between the rearward exterior sloped surface 43 of the gripper ring 14 and the gripper constricting slope 34 of the coupling body 12 causes the gripper ring 14 to be urged inwardly and to constrict, thereby resulting in an engagement of the outer surface of the pipe 24 by the gripping surfaces 44 of the gripper ring 14. Further tightening of the coupling body 12 onto the stub 22 causes the gripping surfaces 44 of the gripper ring 14 to engage the outer surface of the pipe 24 more securely.

The configuration of the gripper ring 14 enhances gripping strength of the coupling 10 while reducing the potential for damage to, and/or collapse of the pipe 24. First, the axial separation of the two gripping surfaces 44 provides stability to the gripper ring 14 as it is pressed against the pipe 24. Second, by having two spaced gripping surfaces 44, the pressure exerted by the coupling 10 on the gripper ring 14 is spread over a wider area on the pipe thereby reducing the likelihood of the gripper ring 14 causing damage to and/or collapse of the pipe 24. Third, by having the central annular groove 46 between the two gripping surfaces 44, a space is created for the pipe material to extrude slightly into this central annular groove 46 as the gripping surfaces 44 press into the pipe 24 thereby improving the gripping capacity of the coupling 10. Although the number of gripping surfaces 44 can be three or greater, the preferred number is two so as to concentrate the inward force on the pipe 24 onto two annular regions, and preferably directly over the rearward seal 16.

Additionally, as the coupling body 12 is tightened onto the stub 22, an inward force is imparted to the pipe 24 thereby causing the pipe 24 to press against both the barbs 74 and the rearward seal 16. Movement of the barbs 74 and rearward seal 16 inwardly is resisted by the rigidity of the support tube 67 of the insert 18. In this manner the rearward seal 16 creates a seal between the support tube 67 and the pipe 24 preventing leakage out the rearward end of the coupling 10. Additionally, the barbs 74 bite into the pipe 24 assisting in preventing inadvertent pull-out of the pipe 24.

Once the forward flat face 35 of the nut section 26 of the coupling body 12 abuts the rearward face 37 of the shoulder 39 of the stub 22, the coupling 10 is fully engaged and a sealed, secured connection between the pipe 24 and the stub 22 has been established. As designed, an ideal seal and securement is established by the coupling 10 when the coupling body 12 is fully tightened onto the nut with the forward flat face 35 of the nut section 26 of the coupling body abutting the rearward face 37 of the shoulder 39 of the stub 22. Thus, it is easy for a user to tell if the coupling 10 is under-tightened, and it is not possible for the coupling 10 to be over-tightened.

To release the connection, the coupling body 12 is unscrewed from the stub 22 thereby disengaging the gripper ring 14 from the pipe 24. The coupling body assembly can then be removed from the stub 22 and the pipe 24 can be slid out of the coupling body assembly.

Because none of the elements of the preferred embodiment coupling has been permanently deformed during use, the coupling 10 can then be reused.

Although an exemplary manner of using the preferred embodiment coupling of the present invention has been described above in detail, it is to be understood that the preferred embodiment coupling can be used in ways other than as explicitly set out above, as readily understood by those skilled in the art. For example, instead of mounting the insert 18 within the stub 22 first and placing the assembled coupling body over the insert 18, the insert 18 can be placed within the coupling body assembly first and then the coupling body assembly with insert 18 within may be placed onto the stub 22. As a further example, the pipe 24 may be inserted into the coupling body assembly first before the insert 18 is installed in the coupling body 12, or before the coupling body assembly is placed over the insert 18 and stub 22.

Although the preferred embodiment coupling has been described above as being used to attach a polyethylene pipe 24 to a fitting, it is to be understood that pipes made of other materials may be used. Indeed any pipe having sufficient rigidity to avoid excessive deformation during tightening and which has a surface soft enough to permit the gripper ring 14 to bite into it, may be used.

Specific materials used for the various elements of the coupling 10 and for the fitting stub 22 have been provided. However, it is to be understood that other suitable materials may be used for these elements as will be understood by those skilled in the art.

Very specific geometries of the various elements have also been provided. However, it is to be understood that persons skilled in the art may use other suitable geometries without necessarily departing from the scope of the invention.

The preferred embodiment coupling has also been described in the context of a waterworks application. However, it is to be understood that the coupling can be used in other applications, plumbing applications for example.

Numerous modifications and variations of the present invention are possible in light of the above teachings. It is therefore to be understood that within the scope of the appended claims, the invention may be practised otherwise than as specifically described herein.

What is claimed is:

1. A coupling for creating a fluid-conducting connection between a pipe and a stub, said stub being free of a pipe-supporting extension over which the pipe is to be slid, said coupling comprising:
    a coupling body having a forward end for being secured to the stub, a rearward end for receiving the pipe, and an internal bore therethrough;
    stub securing means for securing the forward end of the coupling body to the stub;
    a gripper located within the internal bore of said coupling body for gripping said pipe;
    gripper retaining means for retaining said gripper within said coupling body during handling of the coupling body;
    pipe-supporting means located within the internal bore of said coupling body for providing internal support for an end section of the pipe being engaged by the coupling;
    gripper engaging means for causing the gripper to grip the pipe; and
    sealing means for creating a seal between the stub and the pipe;
    wherein:
    the pipe-supporting means is an insert having a rigid support tube at its rearward end, said support tube being adapted to be said within the end section of the pipe;
    the support tube is sized such that its exterior surface closely fits within the pipe;
    the insert has at its forward end an inner web to be inserted within the stub;
    the inner web is sized to fit closely within the stub;
    the sealing means for creating a seal between the stub and the pipe includes a forward seal mounted on an exterior surface of said inner web to create a seal between the inner web and the stub when the inner web is slid within the stub;
    the forward seal is a O-ring;
    the insert has a radially outwardly projecting annular rib extending from a forward end of the support tube;
    said annular rib has a forward face adapted to abut against a rearward end of said stub, and a rearward surface adapted to abut against a forward end of said pipe; and
    said insert has an outer web extending rearwardly from an outer end of said annular rib.

2. The coupling of claim 1 wherein the outer web is sized to fit closely between the pipe and the coupling body.

3. The coupling of claim 2 wherein the gripper engaging means comprises gripper constricting means for radially constricting the gripper such that the gripper engages an exterior surface of said pipe.

4. The coupling of claim 3 wherein when constricted, at least a portion of said gripper intersects a plane which includes the rearward seal and which is perpendicular to a longitudinal axis of said coupling body.

5. The coupling of claim 4 wherein the gripper has a sloped rearward surface, the gripper retaining means is a gripper retaining recess formed on an inner surface of the coupling body for receiving said gripper, said gripper retaining recess having a sloped rearward surface, said sloped rearward surface of said gripper retaining recess adapted to abut the sloped rearward surface of the gripper, and said gripper constricting means comprising moving the coupling body forward relative to the gripper such that cooperation between the sloped rearward surface of the gripper and the sloped rearward surface of the gripper retaining recess causes the gripper to radially constrict.

6. The coupling of claim 5 wherein the coupling body is moved forward relative to the gripper by moving the coupling body forward and resisting substantial forward movement of the gripper by abutting of the forward end of the gripper against a rearward end of said outer web of said insert, forward movement of said insert being restrained by abutting of said forward face of said annular rib against the rearward end of said stub.

7. The coupling of claim 6 wherein the gripper has a sloped forward surface, the rearward end of the outer web has a beveled inner surface, said beveled inner surface of said rearward end of said outer web adapted to abut the sloped forward surface of the gripper, said gripper constricting means further comprising moving the gripper forward relative to the outer web such that cooperation between the sloped forward surface of the gripper and the beveled inner surface of said outer web further causes the gripper to radially constrict.

8. The coupling of claim 7 wherein the gripper is moved forward relative to the outer web by the forward movement of the coupling body causing the gripper to move forward slightly.

9. The coupling of claim 8 wherein the stub is externally threaded and the stub securing means is an internal threading of a forward portion of said coupling body, an interior of said forward portion of the coupling body being sized to fit closely over the stub, and said internal threading of said coupling body matching the external threading of said stub.

10. The coupling of claim 9 wherein the coupling body is moved forward by screw-tightening the forward portion of the coupling body onto the stub.

11. The coupling of claim 10 wherein the gripper retaining recess is a circumferential groove.

12. The coupling of claim 2 wherein the gripper retaining means is a gripper retaining recess formed in an interior surface of the coupling body for receiving at least a portion of said gripper therein.

13. The coupling of claim 12 wherein the gripper retaining recess is a circumferential groove.

14. The coupling of claim 13 wherein the stub is externally threaded and the stub securing means is an internal threading of a forward portion of said coupling body, an interior of said forward portion of a coupling body sized to fit closely over the stub, and said internal threading of said coupling body matching the external threading of said stub.

15. The coupling of claim 14 wherein an exterior surface of the forward portion of said coupling body is hexagonal to facilitate tightening of the coupling body onto the stub.

16. The coupling of claim 15 wherein the stub further comprises a shoulder positioned forwardly of said external threading, said shoulder having a rearward face, and said coupling being fully tightened when a forward face of said coupling body abuts against the rearward face of the shoulder of the stub.

17. The coupling of claim 16 wherein the pipe is polyethylene.

18. The coupling of claim 17 wherein the coupling is coupled to the stub.

19. The coupling of claim 18 wherein the coupling is coupled to the pipe.

20. A coupling for creating a fluid-conducting connection between a pipe and a stub, said stub being free of a pipe-supporting extension over which the pipe is to be slid, said coupling comprising:

a coupling body having a forward end for being secured to the stub, a rearward end for receiving the pipe, and an internal bore therethrough;

stub securing means for securing the forward end of the coupling body to the stub;

a gripper located within the internal bore of said coupling body for gripping said pipe;

gripper retaining means for retaining said gripper within said coupling body during handling of the coupling body;

pipe-supporting means located within the internal bore of said coupling body for providing internal support for an end section of the pipe being engaged by the coupling;

gripper engaging means for causing the gripper to grip the pipe; and sealing means for creating a seal between the stub and the pipe;

wherein:

the pipe-supporting means is an insert having a rigid support tube at its rearward end, said support tube being adapted to be slid within the end section of the pipe;

the support tube is sized such that its exterior surface closely fits within the pipe;

the insert has at its forward end, an inner web adapted to be inserted within the stub;

the inner web is sized to fit closely within the stub;

the sealing means for creating a seal between the stub and the pipe includes a forward seal mounted on an exterior surface of said inner web to create a seal between the inner web and the stub when the inner web is slid within the stub;

the forward seal is an O-ring;

the insert has a radially outwardly projecting annular rib extending from a forward end of the support tube;

said annular rib has a forward face adapted to abut against a rearward end of said stub, and a rearward surface adapted to abut against a forward end of said pipe;

the gripper engaging means comprises gripper constricting means for radially constricting the gripper such that the gripper engages an exterior surface of said pipe; and when constricted, at least a portion of said gripper intersects a plane which includes the rearward seal and which is perpendicular to a longitudinal axis of said coupling body.

21. The coupling of claim 20 wherein the gripper has a sloped rearward surface, the gripper retaining means is a gripper retaining recess formed on an inner surface of the coupling body for receiving said gripper, said gripper retaining recess having a sloped rearward surface, said sloped rearward surface of said gripper retaining recess adapted to abut the sloped rearward surface of the gripper, and said gripper constricting means comprising moving the coupling body forward relative to the gripper such that cooperation between the sloped rearward surface of the gripper and the sloped rearward surface of the gripper retaining recess causes the gripper to radially constrict.

22. The coupling of claim 21 wherein the stub is externally threaded and the stub securing means is an internal threading of a forward portion of said coupling body, an interior of said forward portion of the coupling body being sized to fit closely over the stub, and said internal threading of said coupling body matching the external threading of said stub.

23. The coupling of claim 22 wherein the coupling body is moved forward by screw-tightening the forward portion of the coupling body onto the stub.

24. The coupling of claim 23 wherein the gripper retaining recess is a circumferential groove.

* * * * *